Feb. 6, 1962 F. BERTINOT 3,019,898
SIZING APPARATUS
Filed Oct. 27, 1958 5 Sheets-Sheet 1
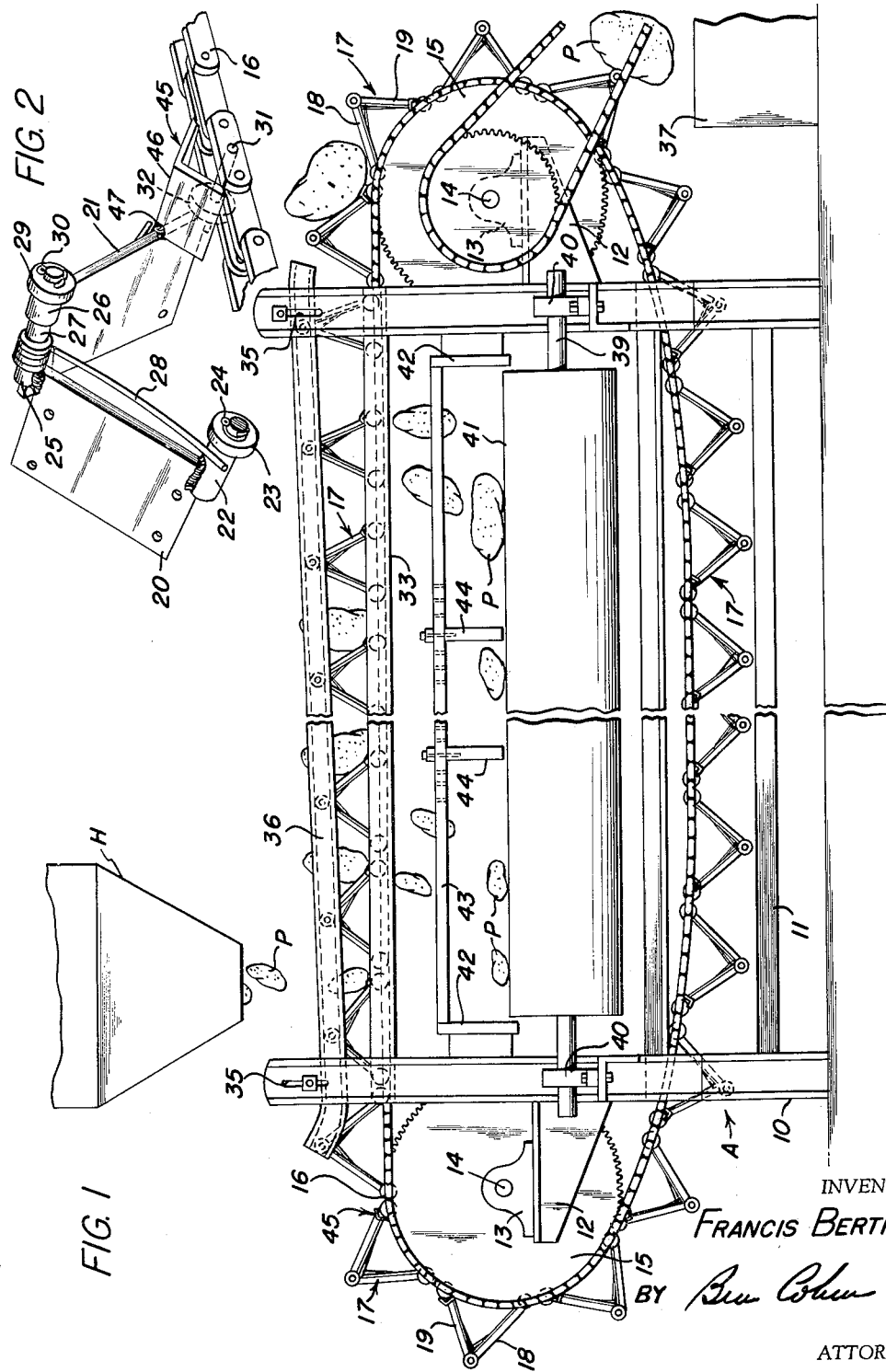
INVENTOR
FRANCIS BERTINOT
BY
ATTORNEY Feb. 6, 1962   F. BERTINOT   3,019,898
SIZING APPARATUS
Filed Oct. 27, 1958   5 Sheets-Sheet 2
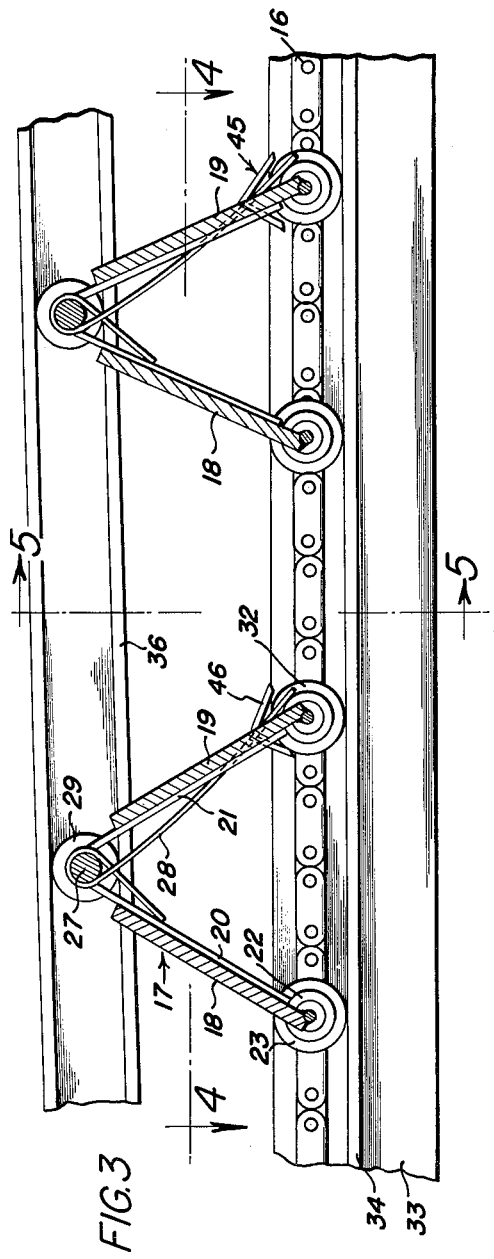
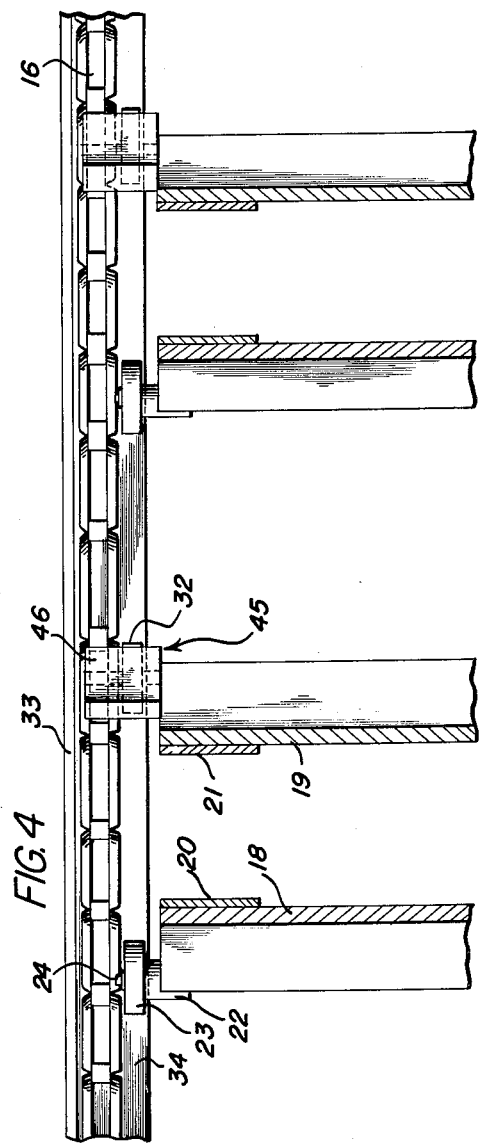
INVENTOR
FRANCIS BERTINOT
BY
ATTORNEY

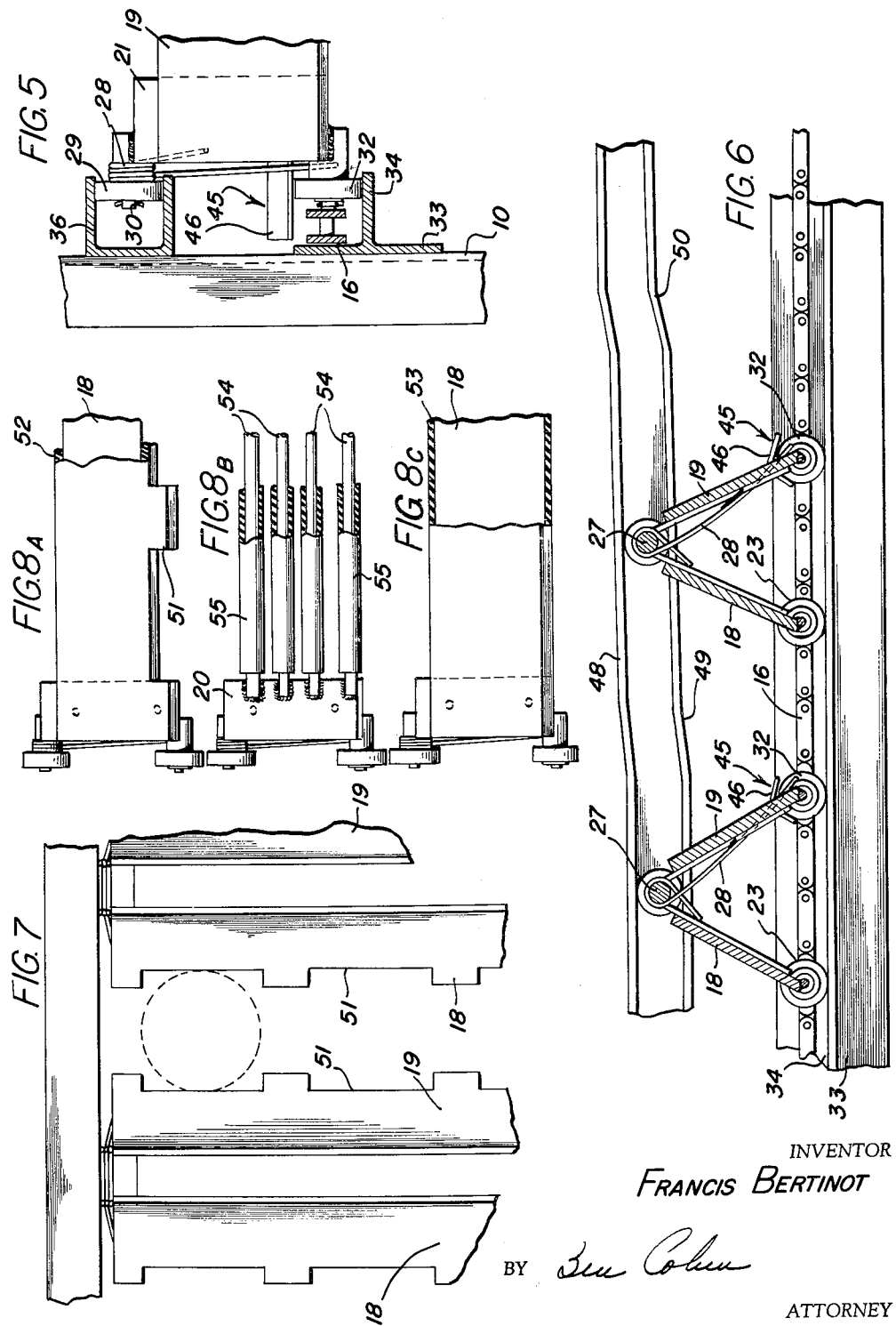

Feb. 6, 1962 F. BERTINOT 3,019,898
SIZING APPARATUS
Filed Oct. 27, 1958 5 Sheets-Sheet 4

INVENTOR
FRANCIS BERTINOT
BY Ben Cohen
ATTORNEY

Feb. 6, 1962 F. BERTINOT 3,019,898
SIZING APPARATUS
Filed Oct. 27, 1958 5 Sheets-Sheet 5
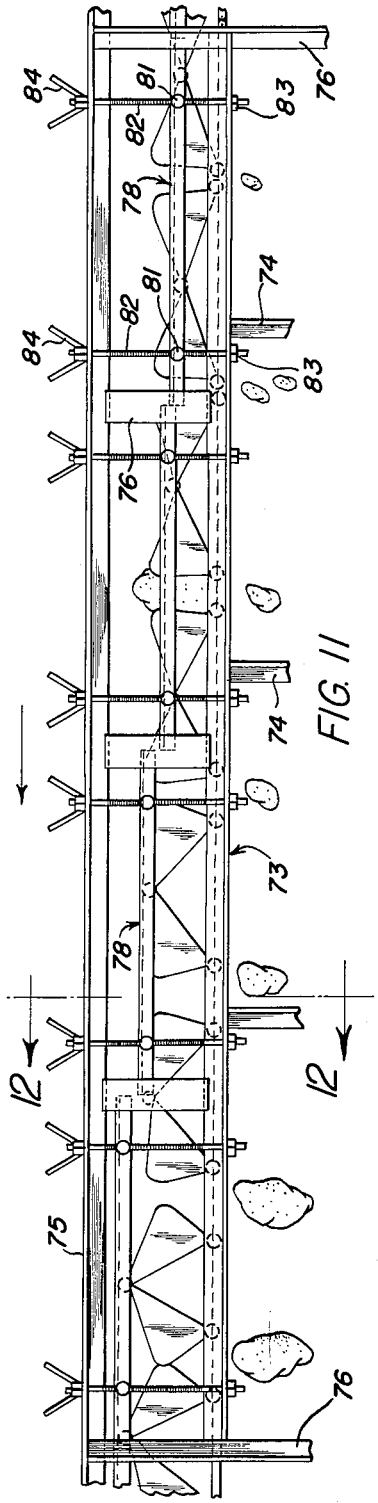
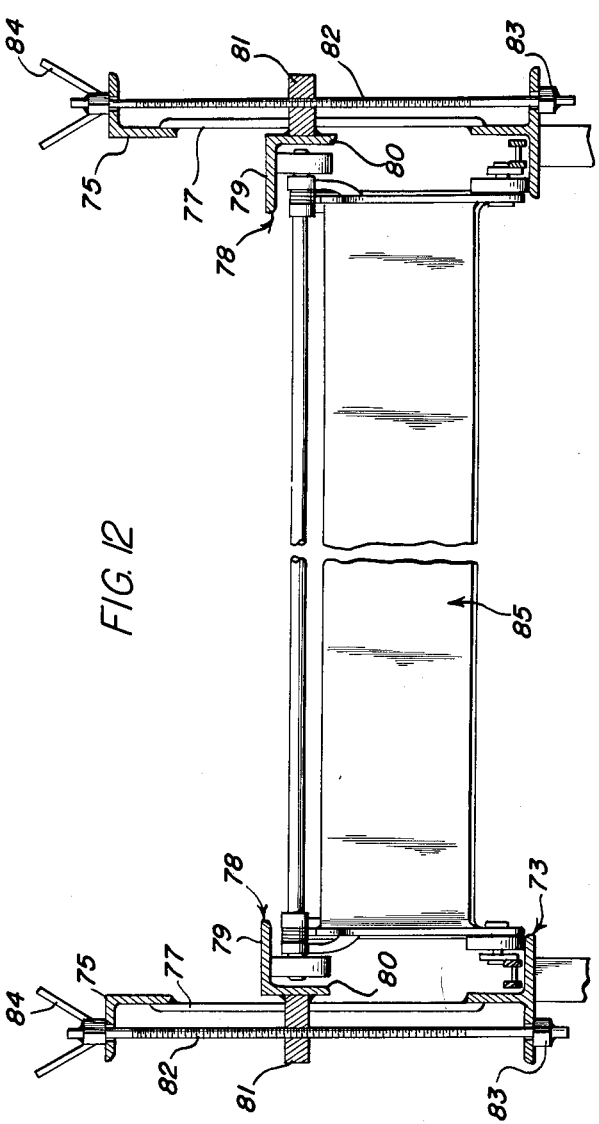
INVENTOR
FRANCIS BERTINOT
BY
ATTORNEY United States Patent Office
3,019,898
Patented Feb. 6, 1962

3,019,898
SIZING APPARATUS
Francis Bertinot, 508 S. Main St., Church Point, La.
Filed Oct. 27, 1958, Ser. No. 769,749
10 Claims. (Cl. 209—102)

This invention relates to a machine for sorting or grading fruits, vegetables and other articles according to size and constitutes an improvement on my prior Patent No. 2,782,922, issued February 26, 1957.

Generally, the present machine comprises a grading surface in the form of a moving carrier having means thereon providing spaces of successively greater widths through which are articles being sized are dropped. The smaller articles drop through the narrower spaces, while the larger articles drop through the wider spaces whereby sorting or grading of the articles according to size is effected. Positioned below the moving carrier and moving at right angles thereto is an endless conveyor mechanism for receiving the sized articles and conveying them to a plurality of bins positioned at one edge of the machine.

A specific feature of the present machine resides in the provision of means on the moving carrier to better support the carrier while it is moving and to eliminate excessive wear on the carrier chain.

A further feature of the present invention resides in providing an improved support arrangement for the moving carrier.

A still further feature of the present invention resides in improvements in the rod or slat structures forming part of the moving carrier.

There are numerous other features and advantages of the present machine over previous sizing machines and these features and advantages will be readily apparent from the following detailed description of the invention.

In the accompanying drawings,

FIGURE 1 is a side elevation of a sorting or grading machine embodying the features of the present invention;

FIGURE 2 is a perspective view of a detail of the slat structure;

FIGURE 3 is an enlarged sectional view of the slat constructure;

FIGURE 4 is a sectional view taken on line 4—4 of FIGURE 3;

FIGURE 5 is a sectional view taken on line 5—5 of FIGURE 3;

FIGURE 6 is a view similar to FIGURE 3 showing a slight modification of the structure shown in FIGURE 3;

FIGURE 7 is an enlarged partial plan view of the cooperating slats;

FIGURES 8a, 8b and 8c show modified forms of the slat structure;

FIGURE 11 is an elevational view of a modified form of guide rail.

FIGURE 12 is a sectional view taken on line 12—12 of FIGURE 11.

Figure 9:
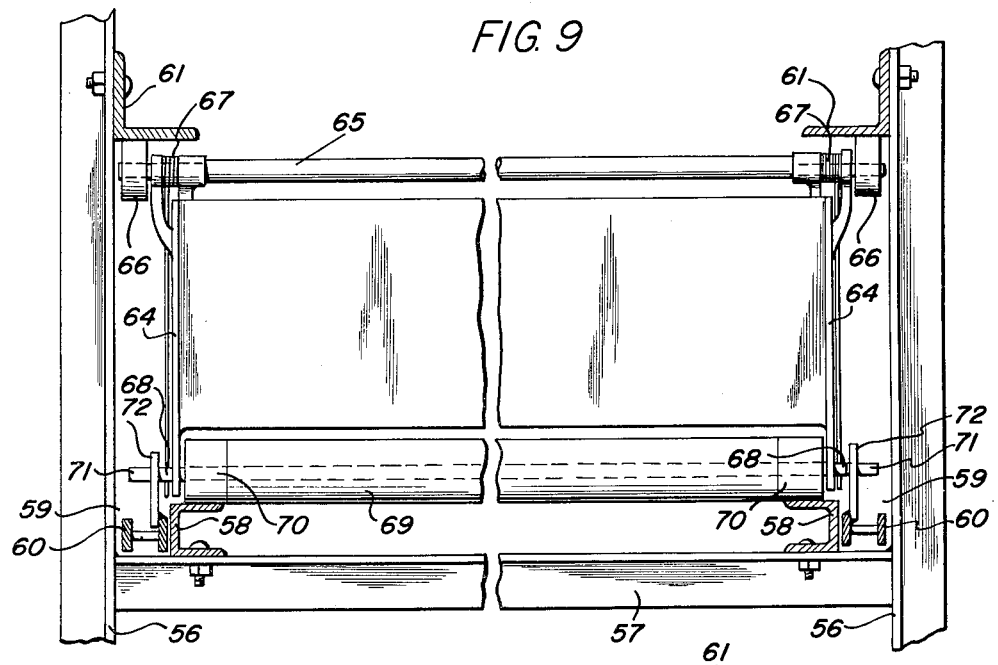
FIGURE 9 shows a sectional view of a modified form of slat construction.

Referring to the drawings in detail, A designates the frame of the machine which may be formed of any suitable material and which, generally speaking, is of elongated rectangular form. This frame may be of any suitable or desirable length, width and height and may be composed of corner uprights or legs 10 connected together by suitable transverse members (not shown) and longitudinal members 11 to form a rigid, open framework for supporting the operating structure.

A plurality of platforms 12 are suitably secured to each end of the frame and support trunnions 13 which carry the transverse shafts 14. Each shaft 14 is provided at its ends with sprocket pulleys 15 carrying endless chains 16, one on each side of the machine.

The grading conveyor comprises a plurality of transversely extending members indicated by numeral 17. Each member comprises a pair of slats 18, 19 of such size as to extend between the oppositely disposed endless chains 16. Affixed to the underside of each of the slats, at each end thereof, are a pair of cooperating hinge plates 20 and 21. As seen in FIGURE 2, the hinge plate has a lower pin 22 mounted thereon and extending beyond the lower corner of the plate to provide a support for a roller 23, removably supported thereon by a cotter pin 24. The upper, outer corner of the plate 20 is provided with a hinge bearing 25 for a purpose to be disclosed. The plate 21 is similarly provided with a hinge bearing 26 to receive a hinge pin 27 which also extends through hinge bearing 25 to pivotally mount the plates 20 and 21 as indicated. A coil spring 28 serves to bring the inner faces of the two plates together. At the outer end of the hinge pin 27 is mounted a roller 29, held in place by a cotter pin 20. Extending from the lower outer corner of the plate 21 is a pin 31 which passes through the link chain 16 and is rigidly secured thereto. Between the plate 21 and the chain 16, a roller 32 is supported on the pin 31 and is of such diameter as to project below the lower surface of the chain for a purpose to be described.

As seen in FIGURES 1 and 5, an elongated track member 33, having a T-shaped cross section, is secured to the corner uprights at each side of the machine, to serve as a trackway for the endless chain members 16. The leg 34 of the track member forms a horizontal track upon which the roller 32 rides. Also secured to the uprights 10 by means of bolts passing through slots 35 are a pair of channel shaped guide members 36. These guide members 36 are spaced a small distance above the rails 33 and are inclined upwardly from left to right as seen in FIGURE 1 for a purpose to be described. As seen in FIGURE 5, the roller 29 is received in the channel member 36 and the inclination of the channel member will control the spacing of the slats as will be pointed out.

As thus far described, the operation of the present machine is similar to the operation of the machine shown in my prior patent. The objects, indicated by the letter P, are fed to the rear end of a machine from a hopper H. The endless chains 16 which are moved by means of a motor (not shown) carry each set of paddles to the upper left hand corner of the machine as viewed in FIGURE 1 until a set of paddles approaches the beginning of channel 36. At this point, the distance between the angle iron 33 and the channel member 36 is less than the width of the paddles, causing the adjoining set of paddles to be closely together with no appreciable distance between the two sets. As the chains move the paddles along as viewed from left to right in FIGURE 1, in view of the inclination of channel member 36 with respect to rail 33, the spring 28 will tend to bring the slats 18 and 19 together thereby creating a space between adjacets sets of paddles, which increase progressively as the paddles approach the right extremity of the machine. It will thus be seen that the potatoes or like objects dropping from the hopper will be received between adjacent sets of paddles and carried along with the paddles. As the space increases in size, the smaller potatoes will drop through the space, with the size of the potatoes dropping through increasing with the increase in the size of the space. Potatoes that are too large are carried over the end of the machine and drop into a bin 37.

Suitable means is provided below the upper portion of the machine to receive the graded potatoes which drop through the carrier and convey them to suitable receiving stations. At each side of the machine and positioned between the area of the moving carrier are rollers mounted on shafts 39 which are mounted for rotation in trunnions 40 supported on the frame 10. An endless conveyor apron 41 is carried by the rollers and conveys the potatoes to the side of the machine into a plurality of bins (not shown). Means is also provided to keep the sized potatoes from commingling on the conveyor table during travel. This means consists of a pair of transverse members 42 suitably secured to the frame of the machine, the ends of said members being joined by a pair of bars 43. Supported from these bars are a plurality of partition members 44 which extend to a point just short of the apron surface. The number and position of the partition members may be varied depending on the size of the potatoes to be separated.

An important feature of the present invention is the provision of a stabilizing device to prevent the paddles from flopping over when descending from the guide rails 33 and 36 and to be in proper position when approaching the guide rails. The stabilizing device, indicated by the numeral 45, and shown in detail in FIGURE 2, comprises an angle bar 46 welded or otherwise secured at 47 to each of the members 21 and projecting therebeyond to overlap the chain member 16. The angle bar 46 thus cooperates with the chain 16 to keep the paddle members 14 in proper position as seen in FIGURE 1.

FIGURE 6 discloses a modified form of channel member 36 wherein the rail 48 is divided into zones by the sharply inclined portions 49 and 50 to provide step by step sizing. Thus when each set of paddles reach point 49, the two slats forming the paddle come together quickly causing the space between the paddles to widen and this same operation occurs when point 50 is reached.

In FIGURE 7, there is disclosed a modified slat construction wherein the lower edges of the slats 18 and 19 are provided with slots 51. These slots may be circular, square or rectangular and for purpose of illustration is shown as rectangular. This arrangement is particularly desirable for sizing round objects by providing three contact points for each slot.

FIGURES 8a, 8b and 8c show slightly modified forms of slat structures forming the paddle members. In FIGURE 8a, the slat member 18 is similar to the construction shown in FIGURE 7 but is provided with a cushioning blanket 52. In FIGURE 8c, the slat 18 is similar to the slat shown in FIGURES 1 and 5 and includes the cushioning blanket 53. In FIGURE 8b, instead of a solid slat member as shown in FIGURES 1 to 5, or a notched slat member as shown in FIGURE 7, the slat consists of a plurality of rods 54 welded to plate members 20, and each of the slats is covered with cushioning material 55. The cushioning material 55 may be loosely mounted for rotation if desired.

Figure 10:
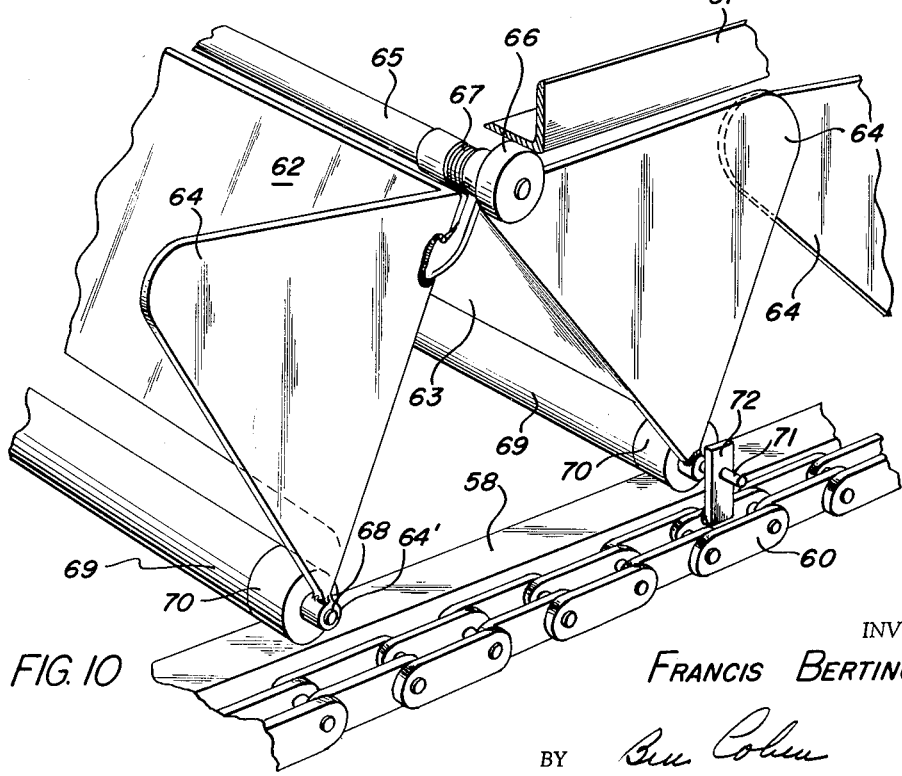
FIGURE 10 is a perspective view of the modification shown in FIGURE 9.

FIGURES 9 and 10 show a further modification of paddle construction and in this form of the invention the frame of the machine is also slightly modified to accommodate this form of paddle construction. In all other respects, the machine is the same as shown in FIGURES 1 to 5 inclusive. The uprights 56 forming the frame are joined by transverse angle irons 57 which serve to support the lower longitudinal channel shaped rails 58. The rails 58 are spaced from the uprights to provide a space 59 for accommodating the chain members 60. A pair of longitudinally extending upper rails 61 in the form of angle irons is bolted or otherwise secured to the uprights 56 as seen in FIGURES 9 and 10.

In this form of the invention, the complementary panel members 62 and 63 are provided with angularly extending wing portions 64 and are pivotally mounted on rod 65. The outer ends of rod 65 are provided with rollers 66 which bear against the undersides of rails 61. Springs 67 urge the paddle members together in the same manner as described in connection with the form of the invention previously described. At the lower end of each of the wing portions, a bearing 64' receives a shaft 68 upon which is mounted a roller 69 formed of resilient material and the outer ends 70 of the roller which ride on the rail 58 may be harder material. Each of shafts 68 mounted in each of paddle members 63 has an extension shaft 71 thereon which extend through blocks 72 rigidly secured at spaced points on chains 60. Stabilizer elements 45 may be provided to the modification shown in FIGURES 9 and 10.

In the operation of this form of the invention, the rollers 69 give a revolving movement to the objects being sized. Since the ends of the rollers ride on the rails, the rollers are continuously revolving.

In the modification shown in FIGURES 11 and 12, the lower guide rail 73 is in the form of an inverted T-iron and is supported by a plurality of uprights 74. Upper angle irons 75 are supported above the rail 73 by uprights 76. Supporting straps 77 are suitably welded at spaced points between the upper angle iron and the lower guide rail 73.

The upper guides for controlling the space between adjacent paddles are formed into a plurality of sections 78, each of which is separately controlled for raising or lowering movement. Each section 78 comprises an angle iron having a horizontal leg 79 and a vertical leg 80. Adjacent each end of section 78 and rigidly secured to the vertical leg 80 is a short shaft 81 which is threaded to receive a threaded bolt 82. The threaded bolt extends through openings formed in the upper angle 75 and the lower rail 73 and is held in freely rotatable position by a nut 83 fixed to the lower end and a wing nut 84 fixed to the upper end. Thus, by turning the bolts 82 by means of nuts 84 at each end of the section 78, the section may be adjusted upwardly or downwardly. The paddle may be constructed as shown in any of the modifications described but as shown in FIGURES 11 and 12, the paddle arrangement is similar to the paddle arrangement shown in FIGURES 9 and 10.

From the foregoing description considered in connection with the accompanying drawings, it is believed that the construction and operation of the present machine will be clearly understood and its advantages appreciated. While I have shown several modifications, it will be clear that minor changes may be made in the details of construction without departing from the spirit of the invention. This application is, therefore, not to be limited to the precise details described, but is intended to cover all variations and modifications thereof falling within the spirit of the invention and the scope of the claims.

Having thus described the invention, what is claimed is:

1. A sizing machine comprising a frame defining a horizontal supporting structure, a carrier movable on said supporting structure, said carrier comprising a plurality of sizing members cooperating to form a conveyor for the articles being sized, each of said members comprising two slats pivoted along their upper edges thereby forming a downwardly opening trough-like member, an endless chain for advancing each of said members, an angular member connected with a slat of each member cooperating with said chain to hold the member in upright position with respect to said chain, means urging the lower edges of said slats together whereby to separate the slats of adjacent members, and means mounted on the frame above the supporting structure for varying the distance between adjacent members.

2. A sizing machine comprising a frame defining a horizontal supporting structure, a carrier movable on said supporting structure, said carrier comprising a plurality of sizing members cooperating to form a conveyor for the articles being sized, each of said members comprising two slats pivoted along their upper edges thereby forming a downwardly opening trough-like member, each of said slats formed of a rigid member having a cushioning blanket thereon, means urging the lower edges of said slats together whereby to separate the slats of adjacent members, and means mounted on the frame above the supporting structure for varying the distance between adjacent members.

3. A sizing machine comprising a frame defining a horizontal supporting structure, a carrier movable on said supporting structure, said carrier comprising a plurality of sizing members cooperating to form a conveyor for the articles being sized, each of said members comprising two slats pivoted along their upper edges thereby forming a downwardly opening trough-like member, each of said slats comprising a rigid member having notched portions extending across its lower edge, the notches of each slat being complementary to the notches in the other slat, means urging the lower edges of said slats together whereby to separate the slats of adjacent members, and means mounted on the frame above the supporting structure for varying the distance between adjacent members.

4. A sizing machine comprising a frame defining a horizontal supporting structure, a carrier movable on said supporting structure, said carrier comprising a plurality of sizing members cooperating to form a conveyor for the articles being sized, each of said members comprising two slats pivoted along their upper edges thereby forming a downwardly opening trough-like member, each of said slats comprising a pair of plate members having a plurality of bars extending between said plate members, means urging the lower edges of said slats together whereby to separate the slats of adjacent members, and means mounted on the frame above the supporting structure for varying the distance between adjacent members.

5. A sizing machine comprising a frame defining a horizontal supporting structure, a lower guide rail at each side of said frame, a carrier movable on said supporting structure, said carrier comprising a plurality of sizing members cooperating to form a conveyor for the articles being sized, each of said sizing members comprising two slats pivoted along their upper edges thereby forming a downwardly opening trough-like member, a roller mounted at the lower edge of each of the slats, the ends of said rollers bearing against each of the lower guide rails, means urging the lower edges of said slats together whereby to separate the slats of adjacent members, and means mounted on the frame above the supporting structure for varying the distance between adjacent members.

6. A sizing machine comprising a frame defining a horizontal supporting structure, a lower guide rail at each side of said frame, a carrier movable on said supporting structure, said carrier comprising a plurality of sizing members cooperating to form a conveyor for the articles being sized, each of said sizing members comprising two slats pivoted along their upper edges thereby forming a downwardly opening trough-like member, a roller mounted on each of the slats and bearing against each of the lower guide rails, means urging the lower edges of said slats together whereby to separate the slats of adjacent members, means mounted on the frame above the supporting structure for varying the distance between adjacent members, and said means comprising a guide member formed of a plurality of sections, each section being separately adjustable in a vertical direction.

7. A sizing machine comprising a frame defining a horizontal supporting structure, a lower guide rail at each side of said frame, a carrier movable on said supporting structure, said carried comprising a plurality of sizing members cooperating to form a conveyor for the articles being sized, each of said sizing members comprising two slats pivoted along their upper edges thereby forming a downwardly opening trough-like member, an endless chain for advancing each of said members, an angular member connected with a slat of each member cooperating with said chain to hold the member in upright position with respect to said chain, means urging the lower edges of said slats together whereby to separate the slats of adjacent members, said means comprising a coil spring mounted adjacent the outer ends of said slats.

8. A sizing machine comprising a frame defining a horizontal supporting structure, a lower guide rail at each side of said frame, a carrier movable on said supporting structure, said carrier comprising a plurality of sizing members cooperating to form a conveyor for the articles being sized, each of said sizing members comprising two slats pivoted along their upper edges thereby forming a downwardly opening trough-like member, each of the slats having wing members at its ends, means urging the lower edges of said slats together whereby to separate the slats of adjacent members, means mounted on the frame above the supporting structure for varying the distance between adjacent members, and said means comprising a guide member formed of a plurality of sections, each section being separately adjustable in a vertical direction.

9. A sizing machine comprising a frame defining a horizontal supporting structure, a lower guide rail at each side of said frame, a carrier movable on said supporting structure, said carrier comprising a plurality of sizing members cooperating to form a conveyor for the articles being sized, each of said sizing members comprising two slats pivoted along their upper edges thereby forming a downwardly opening trough-like member, a roller mounted at the lower edge of each of the slats, the ends of said rollers bearing against each of the lower guide rails, each of the slats having wing members at its ends, means urging the lower edges of said slats together whereby to separate the slats of adjacent members, and means mounted on the frame above the supporting structure for varying the distance between adjacent members.

10. A sizing machine comprising a frame defining a horizontal supporting structure, a carrier movable on said supporting structure, said carrier comprising a plurality of sizing members cooperating to form a conveyor for the articles being sized, each of said members comprising two slats pivoted along their upper edges thereby forming a downwardly opening trough-like member, an endless chain for advancing each of said members, an angular member connected with a slat of each member cooperating with said chain to hold the member in upright position with respect to said chain, means urging the lower edges of said slats together whereby to separate the slats of adjacent members, said means comprising a coil spring mounted adjacent the outer ends of said slats, and means mounted on the frame above the supporting structure for varying the distance between adjacent members.

References Cited in the file of this patent
UNITED STATES PATENTS 2,782,922     Bertinot _____ Feb. 26, 1957